No. 770,327. PATENTED SEPT. 20, 1904.
C. H. SMITH.
WIND WHEEL.
APPLICATION FILED JULY 2, 1903.
NO MODEL.

WITNESSES:
Herman Meyer
Bartlett J. Smith

INVENTOR
C. Harold Smith
BY
Stephen J. Cox
ATTORNEY

No. 770,327. Patented September 20, 1904.

UNITED STATES PATENT OFFICE.

CHARLES HAROLD SMITH, OF NEW YORK, N. Y.

WIND-WHEEL.

SPECIFICATION forming part of Letters Patent No. 770,327, dated September 20, 1904.

Application filed July 2, 1903. Serial No. 164,014. (No model.)

*To all whom it may concern:*

Be it known that I, CHARLES HAROLD SMITH, a citizen of the United States, and a resident of New York city, county of New York, and State of New York, have invented certain new and useful Improvements in Wind-Wheels, of which the following is a specification.

My invention relates to games and toys, and particularly to toys adapted to be employed for amusement or for advertising purposes, which are operated by the movement of the air. Its objects are, among others, to provide a device of this kind of interesting and novel character which will be of simple and durable construction and which may be easily operated and which will also afford ample opportunity for the display of advertising or other printed matter thereon. It is illustrated in the accompanying drawings, in which—

Figure 1:
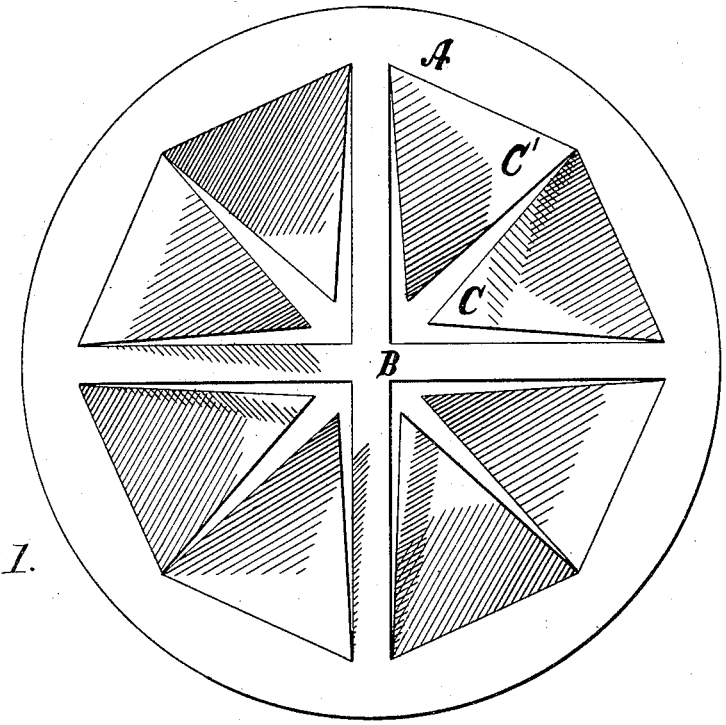
Figure 2:
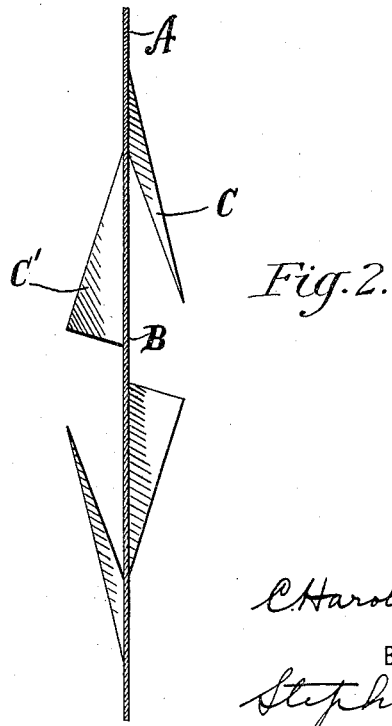

Figure 1 is a plan view of a wind-wheel embodying my improvements. Fig. 2 is a vertical medial cross-section of the same.

The device as illustrated in the drawings is manufactured from a single piece of paper, cardboard, or other suitable material, which is first cut in the shape of a circular disk. After the disk has been cut out radial cuts are then made through the material from a point near the periphery to the center thereof, thus forming the V-shaped wings or flanges C C' and the cross-pieces B, extending diametrically across the disk at right angles to each other. This cutting operation also leaves a margin A between the wings and the periphery. After the wings have been formed by the cuts they are bent outwardly at an angle of approximately thirty degrees to the plane of the disk, the wings C being bent in one direction and the alternate wings C' in the opposite direction. There is thus formed a disk provided with a plurality of flanges extending from each side thereof at a point near its periphery and tapering toward the center thereof and provided with cross-pieces which strengthen the disk and prevent it from losing its proper shape.

The use and operation of the disk are as follows: It is placed upon the ground, pavement, or elsewhere and in a substantially horizontal position. It will, however, be seen that the wings projecting from the surface of the disk will prevent it from lying flat on the ground and will cause it to tilt in one direction or another. When a gust of wind strikes the wheel, it will raise the same to a vertical position, and as the wings projecting on either side offer the greatest resistance to the wind the disk will assume a position substantially edgewise to the wind and at the same time will be caused to roll along on its edge upon the ground.

In using the device it is not necessary to use any care in placing the same in position to be operated by the wind, and it may be simply thrown on the ground carelessly, when it will be picked up and rolled, as above described. The rolling of the wheel along the ground without any apparent cause is a sight which will quickly attract the attention of any person, and this renders the device peculiarly adapted for the purpose of displaying and circulating advertisements (not shown) which may be printed thereon before the cutting operation.

What I claim is—

1. In a device of the character described, the combination of a disk, a plurality of wing-flanges projecting in opposite directions therefrom, secured near the periphery of the disk and extending inwardly and tapering on substantially radial lines, and strips separating the said wings and dividing them into pairs.

2. The combination of a disk with a plurality of wing-flanges extending inwardly from the periphery and outwardly from the plane of and on opposite sides thereof, secured to the said disk near its periphery, the flanges extending from one side being alternated with those extending from the opposite side around the outer portion of said disk.

3. A wind-wheel, embodying a disk, having a plurality of independent wings, secured near the periphery of the disk on lines substantially perpendicular to the radius of the disk, and projecting alternately in opposite directions from the plane of the disk.

Witness my hand, this 18th day of June, 1903, at the city of New York, in the county and State of New York.

C. HAROLD SMITH.

Witnesses:
R. CANTZLAAR,
M. HERDLING.